(12) United States Patent
Shirasawa (10) Patent No.: US 10,812,685 B2
(45) Date of Patent: Oct. 20, 2020

(54) COLOR TONE CONTROL DEVICE AND IMAGE FORMING APPARATUS

(71) Applicant: Hisao Shirasawa, Kanagawa (JP)

(72) Inventor: Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/282,569

(22) Filed: Feb. 22, 2019

(65) Prior Publication Data

US 2019/0268502 A1 Aug. 29, 2019

(30) Foreign Application Priority Data

Feb. 26, 2018 (JP) ................................ 2018-032323

(51) Int. Cl.
*H04N 1/60* (2006.01)
*H04N 1/00* (2006.01)

(52) U.S. Cl.
CPC ........... *H04N 1/6027* (2013.01); *H04N 1/603* (2013.01); *H04N 1/00034* (2013.01); *H04N 1/00087* (2013.01)

(58) Field of Classification Search
CPC .. H04N 1/6027; H04N 1/603; H04N 1/00034; H04N 1/00087
USPC ......................................... 358/1.9, 1.15, 518
See application file for complete search history.

(56) References Cited

U.S. PATENT DOCUMENTS

| 2007/0139734 | A1 | 6/2007 | Fan et al. | |
| 2012/0050771 | A1* | 3/2012 | Sakatani | G03G 15/0131 358/1.9 |
| 2013/0286442 | A1 | 10/2013 | Nishida et al. | |
| 2014/0268259 | A1* | 9/2014 | Kitai | H04N 1/00005 358/504 |
| 2016/0134782 | A1* | 5/2016 | Yamamuro | H04N 1/6036 358/1.9 |
| 2019/0098177 | A1* | 3/2019 | Yoshida | H04N 1/4057 |

FOREIGN PATENT DOCUMENTS

| JP | 2010-201819 | 9/2010 |
| JP | 2012-165296 | 8/2012 |
| JP | 5150096 | 12/2012 |
| JP | 5253602 | 4/2013 |

* cited by examiner

*Primary Examiner* — Quang N Vo
(74) *Attorney, Agent, or Firm* — Harness, Dickey & Pierce P.L.C.

(57) ABSTRACT

According to an embodiment, a color tone control device includes circuitry. The circuitry is configured to extract, from a master image in which a color patch is added outside a printing image area, a color measurement target area in the printing image area; calculate a color measurement area of the color patch from the master image; and generate a gradation correction parameter for correcting gradation depending on a color tone variation amount that is based on the color measurement area of the color patch and the color measurement target area in the printing image area.

17 Claims, 7 Drawing Sheets

COLOR TONE CONTROL DEVICE AND IMAGE FORMING APPARATUS

CROSS-REFERENCE TO RELATED APPLICATIONS

The present application claims priority under 35 U.S.C. § 119 to Japanese Patent Application No. 2018-032323, filed on Feb. 26, 2018. The contents of which are incorporated herein by reference in their entirety.

BACKGROUND OF THE INVENTION

1. Field of the Invention

The present invention relates to a color tone control device and an image forming apparatus.

2. Description of the Related Art

In general, when color printing is performed on a recording medium, it is necessary to adjust colors because the colors are changed over time. As one example of a color adjustment method, a color chart image in which patches are arrayed is output on a recording medium, and colors of the color patches on the recording medium are measured using a sensor that is provided on a printing apparatus. Then, the amounts of variation in colors are obtained by comparing color measurement values and a reference value, and an image processing parameter is adjusted to obtain desired colors.

In addition, conventionally, a technology for adjusting colors by extracting a color measurement target area from a printing image area and analyzing a temporal change has been known.

Furthermore, Japanese Patent No. 5150096 discloses a technology for adjusting colors by automatically measuring colors of color patches arranged in an accompanying area that is located outside the printing image area while continuous printing is being performed, for the purpose of enabling dynamic calibration during the continuous printing.

However, according to the technology disclosed in Japanese Patent No. 5150096, because the color patches are arranged outside the printing image area, there is a problem in that it is difficult for a printing apparatus that causes large color unevenness to occur in a page to accurately detect average variation in color tones over the entire image through color measurement that is based on only the color patches.

Furthermore, according to the technology for adjusting colors by extracting a color measurement target area from a printing image area and analyzing a temporal change, if a printing image does not have an adequate number of colors, it is difficult to collect adequate color measurement data and an estimation error of the temporal change is increased, so that it is difficult to stably correct variation in color tones.

In view of the foregoing situations, there is a need to provide a color tone control device and an image forming apparatus capable of dynamically correcting variation in color tones with accuracy without the influence of a pattern of a printing image, and improving stability of an output image.

SUMMARY OF THE INVENTION

According to an embodiment, a color tone control device includes circuitry. The circuitry is configured to extract, from a master image in which a color patch is added outside a printing image area, a color measurement target area in the printing image area; calculate a color measurement area of the color patch from the master image; and generate a gradation correction parameter for correcting gradation depending on a color tone variation amount that is based on the color measurement area of the color patch and the color measurement target area in the printing image area.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of a color tone control device and an image forming apparatus will be described in detail below with reference to the accompanying drawings.

Figure 1:
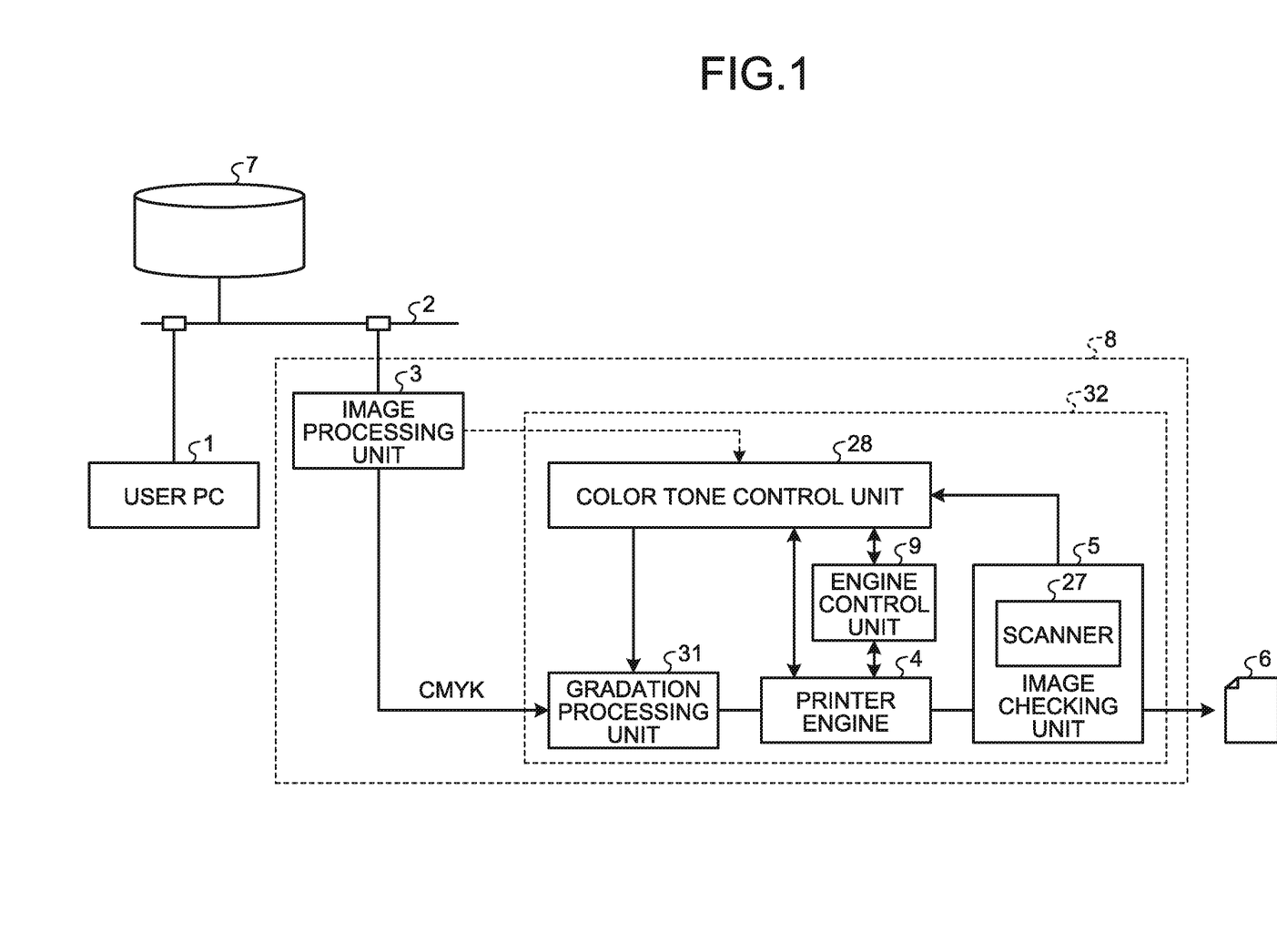
FIG. 1 is a diagram schematically illustrating an image forming apparatus according to an embodiment.

FIG. 1 is a diagram schematically illustrating an image forming apparatus 8 according to an embodiment. As illustrated in FIG. 1, the image forming apparatus 8 is connected to one or more user personal computers (PCs) 1 and a server 7 via a network 2. The user PC 1 transmits image data and a print request to the image forming apparatus 8. The server 7 accumulates information that is needed for color conversion that is needed by an image processing unit 3 to be described later.

In general, the image data for which a print request is issued by the user PC 1 has a complex data format that includes a bitmap in which colors are specified by RGB or CMYK, text, and a graphic drawing command.

As illustrated in FIG. 1, the image forming apparatus 8 includes the image processing unit 3, a printer engine 4, an engine control unit 9, a gradation processing unit 31, an image checking unit 5, and a color tone control unit 28.

The image processing unit 3 is also referred to as a digital front end (DFE). The image processing unit 3 loads received image data, and sends the image data as a pixel array that is constructed with basic colors of the printer engine 4 (bitmap data or a compression format equivalent to bitmap data) to the gradation processing unit 31.

The printer engine 4 is an electrophotographic image forming unit that performs printing itself and forms an output image 6. The engine control unit 9 controls the printer engine 4. The engine control unit 9 is mounted on the same casing as the printer engine 4. The gradation processing unit 31 converts the pixel array that is loaded by the image processing unit 3 to the number of gradations that can be output by the printer engine 4.

The image checking unit 5 checks the output image 6 generated by the printer engine 4. More specifically, the image checking unit 5 includes a scanner (RGB scanner) 27 that is an image measuring means including an RGB line sensor and a paper feed mechanism. The image checking unit 5 causes the scanner 27 to scan the output image 6 sent from the printer engine 4, and corrects gradation correction parameters of the engine control unit 9 and the gradation processing unit 31 such that an error from a target color is minimized. With this configuration, it is possible to stabilize reproduced colors of the output image 6. Here, as the target color, a predicted value that is obtained by a color measurement predicting unit 21 that is a predicting means to be described later (see FIG. 2) or a scan image that is initial print-out held in an image buffer that is an image holding means is used.

The color tone control unit 28 functions as a color tone control device that controls color tones of the printer engine 4 on the basis of a master image that is generated on a recording medium by the printer engine 4. The color tone control unit 28 detects variation in color tones (variation in densities, variation in hues, or the like) of an output image from a checking result of the image checking unit 5, and gives a gradation correction parameter to the gradation processing unit 31.

A body unit group 32 includes the engine control unit 9, the printer engine 4, the color tone control unit 28, the gradation processing unit 31, and the image checking unit 5.

The image processing unit 3 is provided on an extension board that is separated from the body unit group 32, and is replaceable with respect to the body unit group 32.

Next, the color tone control unit 28 will be described in detail.

Figure 2:
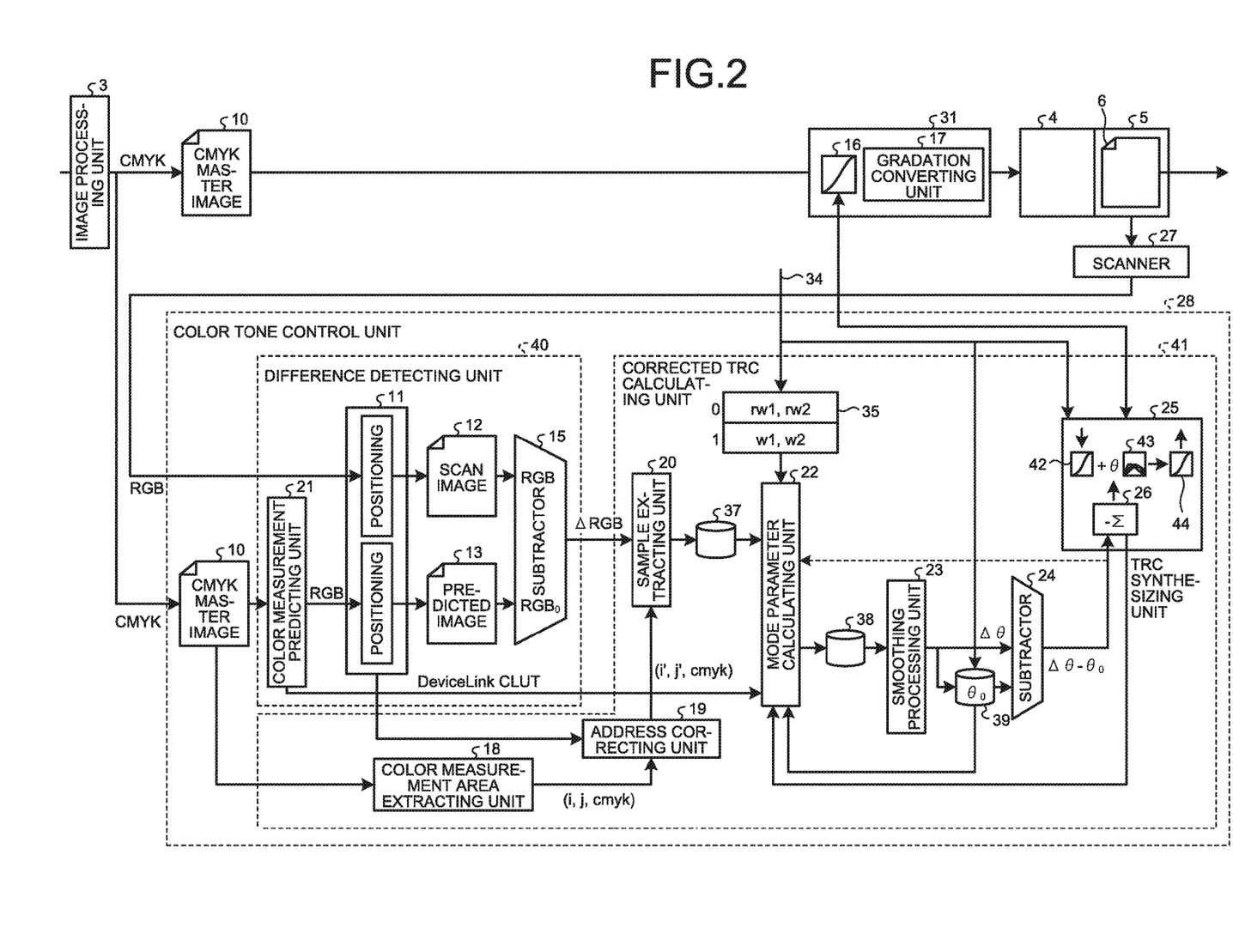
FIG. 2 is a block diagram illustrating an image processing system that is based on a color tone control unit.

FIG. 2 is a block diagram illustrating an image processing system that is based on the color tone control unit 28. As illustrated in FIG. 2, the image processing unit 3 loads a user document, which is written in various input formats, onto a CMYK master image 10 that is a frame sequential pixel array based on 8-bit each for CMYK, for each page.

The gradation processing unit 31 includes a gradation correction table 16, which is a lookup table (LUT) serving as a tone correcting means, and a gradation converting unit 17. The gradation converting unit 17 associates, by an area coverage modulation method, a pixel array that is based on area-bit each for CMYK with a pixel array that has a certain bit (for example, 2-bit) gradation that can be drawn by the printer engine 4. The gradation correction table 16 is a correction table with 8-bit input/8-bit output each for CMYK. In the gradation correction table 16, a table value for normalizing density characteristics of the output image 6 corresponding to input of the gradation processing unit 31 is set through calibration that is performed in advance.

The scanner 27 is, in reality, incorporated in the image checking unit 5 that is directly connected to the printer engine 4. The scanner 27 scans the output image 6 generated by the printer engine 4, by using the RGB line sensor.

The color tone control unit 28 detects a change in printing reproduced colors on the basis of a scan image (RGB) obtained from the scanner 27 and the CMYK master image 10 obtained from the image processing unit 3, and corrects a value (TRC) of the gradation correction table 16 (TRC), which is a gradation correction parameter, to thereby stabilize reproduced colors of the output image. In addition, when a color bar print mode is designated, the color tone control unit 28 controls color stabilization by monitoring variation in densities of a color bar CB (see FIG. 6) that is printed on the recording medium.

The color tone control unit 28 includes a difference detecting unit 40 and a corrected TRC calculating unit 41. The difference detecting unit 40 includes the color measurement predicting unit 21, and a resist correcting unit 11, a subtractor 15. The corrected TRC calculating unit 41 includes the color measurement area extracting unit 18, an address correcting unit 19, a sample extracting unit 20, a sample buffer 37, a mode parameter calculating unit 22, a mode parameter buffer 38, a smoothing processing unit 23, a calculation condition selector 35, a mode parameter memory 39, a subtractor 24, and a TRC synthesizing unit 25.

In the present embodiment, functions implemented by the color tone control unit 28 may be realized by causing a central processing unit (CPU) to execute a program, or a part or all of the functions of the units described above may be realized by a dedicated hardware circuit.

The color measurement predicting unit 21 that is the predicting means sets, as a multi-dimensional LUT, correspondence relationships of scan image data (RGB values) of the scanner 27 corresponding to data of the CMYK master image 10 through calibration that is performed in advance. The color measurement predicting unit 21 predicts an RGB measurement value to be scanned by the scanner 27 from a CMYK value of the CMYK master image 10 using the multi-dimensional LUT and an interpolation calculation. As a concrete example of the prediction model as described above, for example, a device link model defined by ISO 15076-1 is known.

The resist correcting unit 11 corrects minute deviation (magnification, offset, rotation, or distortion) between a predicted image 13 (RGB) obtained by the color measurement predicting unit 21 and a scan image 12. Correction information needed for the correction at this time (a correction parameter related to magnification, offset, rotation, or distortion) is shared as address correction information of the address correcting unit 19 to be described later.

The subtractor 15 outputs differential image data obtained by subtracting the predicted image 13 that is a reference image from the scan image 12.

In parallel to the processes as described above, the color measurement area extracting unit 18 extracts, from the CMYK master image 10, an image area that is a rectangular color measurement target area with a certain size determined in advance (2.5-mm square in the present embodiment) and that has relatively small density variation suitable for color measurement, and generates an address list indicating a color measurement suitable area position.

Figure 3:
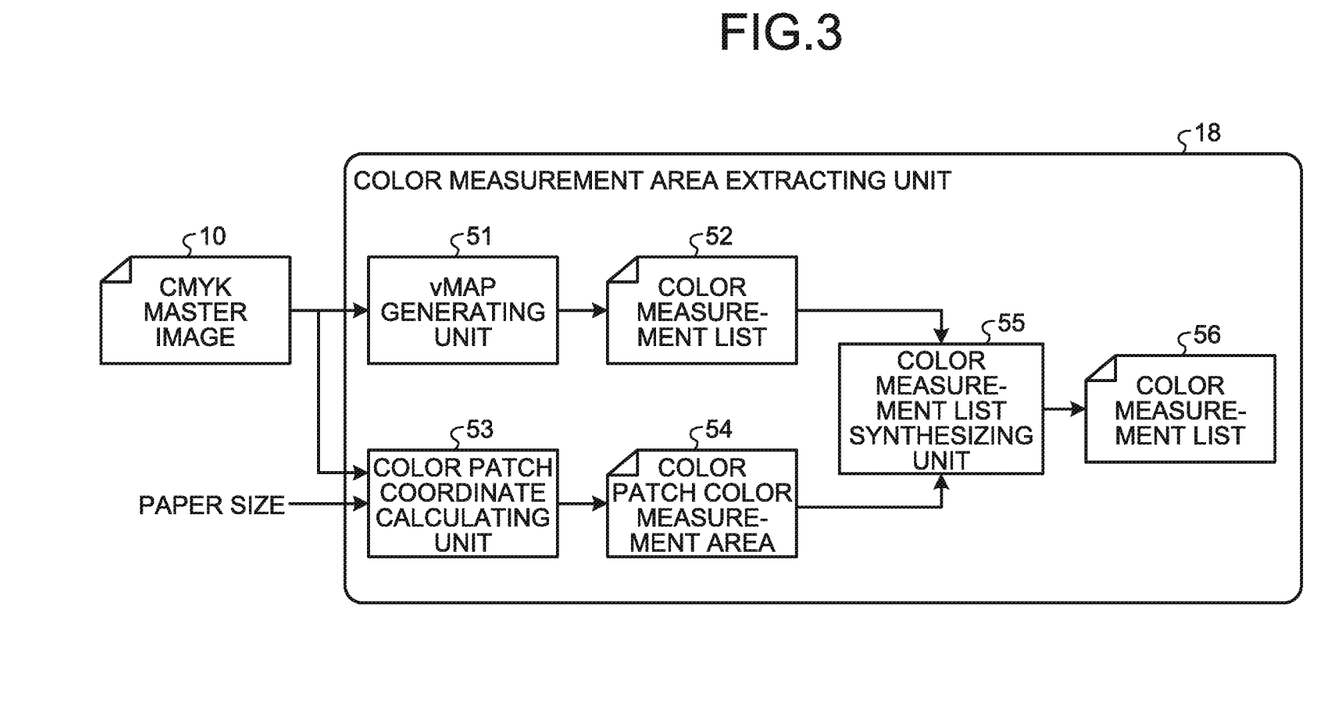
FIG. 3 is a block diagram related to a color measurement list generation process performed by a color measurement area extracting unit.

FIG. 3 is a block diagram illustrating a color measurement list generation process performed by the color measurement area extracting unit 18. The color measurement area extracting unit 18 includes a vMap generating unit 51, a color patch coordinate calculating unit 53, and a color measurement list synthesizing unit 55.

The vMap generating unit 51 functions as a color measurement target area extracting unit. The vMap generating unit 51 generates a color measurement list 52 by generating a vMap (a color measurement suitable area map) while referring to the CMYK master image 10. The vMap is a map in which all of small evaluation areas that are available as color measurement target areas are collected with respect to the CMYK master image 10, and details thereof will be described later.

The vMap generating unit 51 randomly selects a specified number of color measurement target areas in each of segments on the basis of the vMap. A list of the selected areas will be referred to as the color measurement list 52. Meanwhile, the segment is defined as a unit of area obtained by equally dividing an image in the sub-scanning direction. The number of divisions is set as 16 segments for each page (modifiable). The color measurement target areas registered in the color measurement list 52 are extracted as areas. Information on the color measurement target areas that are registered in the color measurement list 52 is eventually used for calculation of a θ value.

Figure 4:
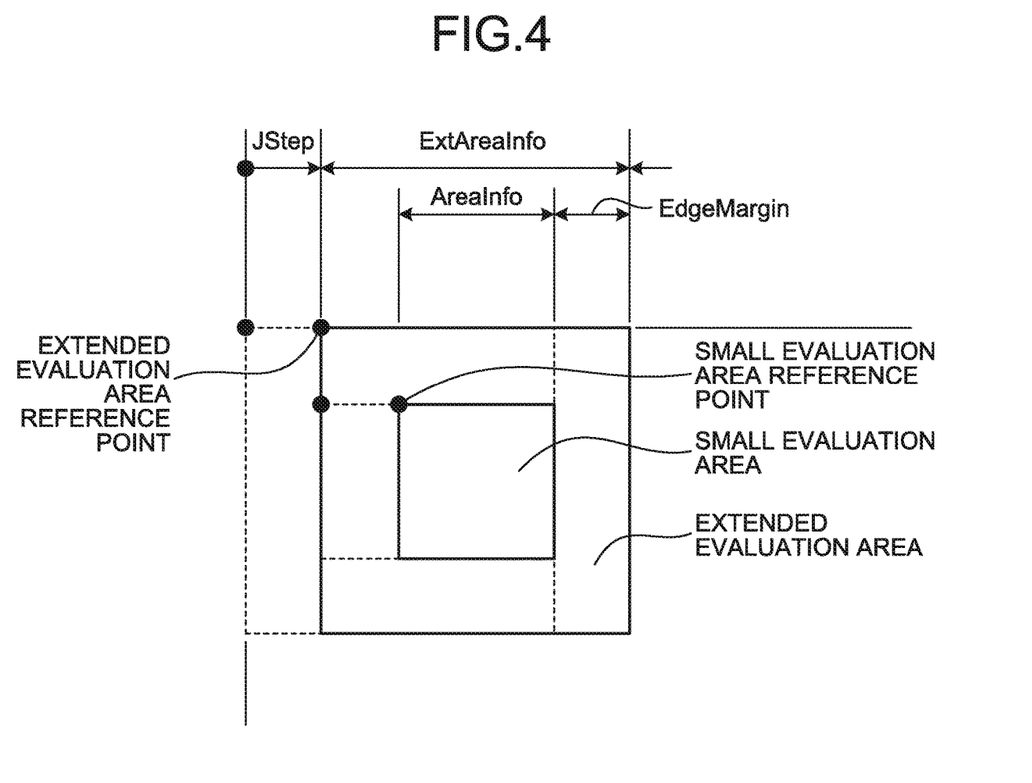
FIG. 4 is a diagram illustrating an example of a color measurement target area of a user image.

FIG. 4 is a diagram illustrating an example of a color measurement target area of a user image. As illustrated in FIG. 4, a small evaluation area that is available as a color measurement target area with respect to the CMYK master image 10 is referred to as a color measurement target area, and a map in which all of the color measurement target areas are collected will be referred to as a vMap. The color measurement target area has a size of about 3 mm×3 mm area, but may be changed depending on characteristics of the image forming apparatus 8.

An extended evaluation area is obtained by adding an edge margin around the small evaluation area, and by excluding an area that includes a color change exceeding a predetermined threshold within a range including the edge margin, the influence of flare on a measurement value of the small evaluation area is prevented.

Further, if the total amount of toner in the small evaluation area exceeds a certain value, a relationship between a color tone variation amount of each plate of CMYK and a color measurement value is not stabilized, so that the area is regarded as not being suitable for the color measurement target area and is excluded.

After a suitability determination process as described above is performed on the entire image area, detected color measurement suitable areas are distributed to each of the segments, depending on positions in the sub-scanning direction (i in original coordinates).

Figure 5:
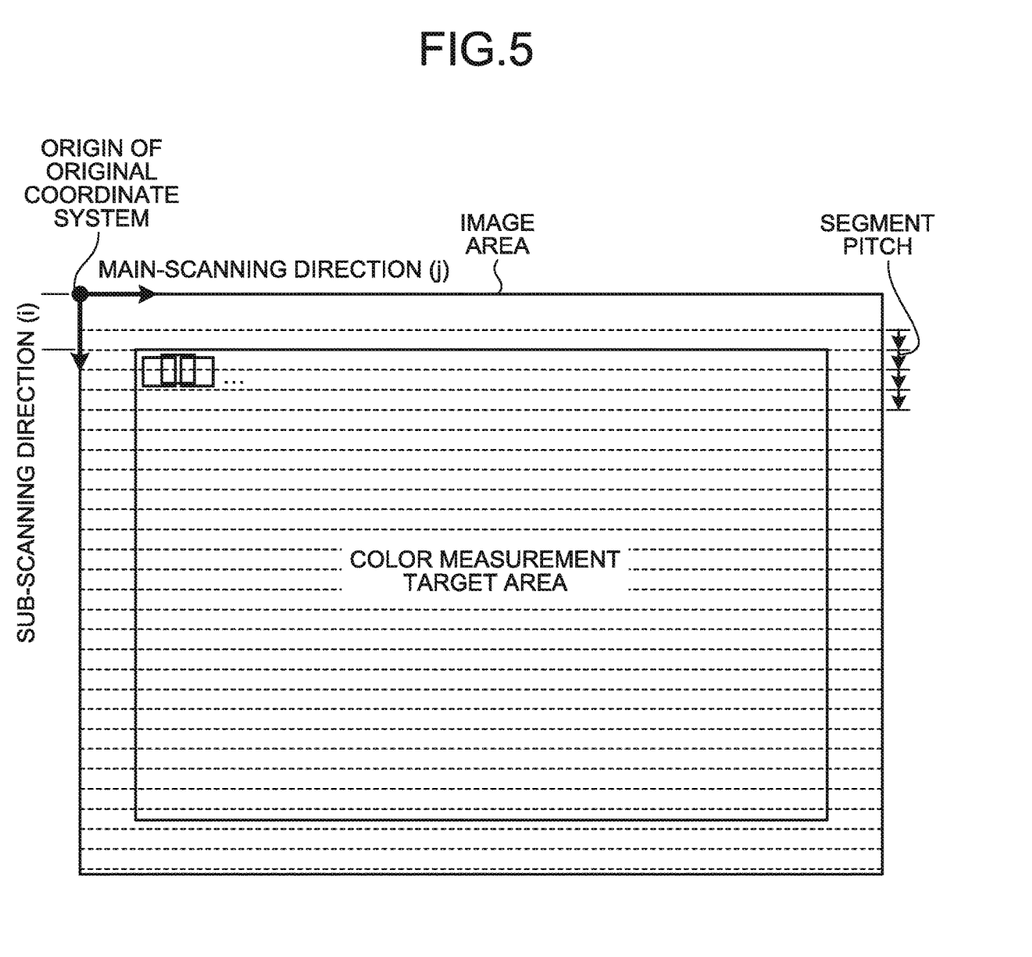
FIG. 5 is a diagram for explaining an image scanning method for generating a vMap.

FIG. 5 is a diagram for explaining an image scanning method for generating the vMap (the color measurement suitable area map). An outermost rectangle in FIG. 5 is an image area of the CMYK master image 10. The color measurement target area is set with predetermined margins on the left, right, top, and bottom of the image area.

The vMap is an array of data (AreaInfo) that is constituted of a color measurement suitability determination value of each of the small evaluation areas as illustrated in FIG. 4 and a CMYK average value in the image area for each plate of CMYK, and is calculated by scanning the extended evaluation area (an extended evaluation area reference point in FIG. 4) by J Step in the main-scanning direction and I Step in the sub-scanning direction at a time while giving priority to the main-scanning direction, by using the upper left edge (the origin of an original coordinate system) of the CMYK master image 10 in FIG. 5 as a point of origin.

Referring back to FIG. 3, when the print mode is the color bar print mode, the color patch coordinate calculating unit 53 that functions as a color patch color measurement area extracting unit calculates each of color patch color measurement areas 54 included in the color bar on the basis of the size of a recording medium. The color measurement list synthesizing unit 55 updates a color measurement list 56 by adding the color patch color measurement area 54 to the color measurement list 52 that is calculated from the vMap.

Figure 6:
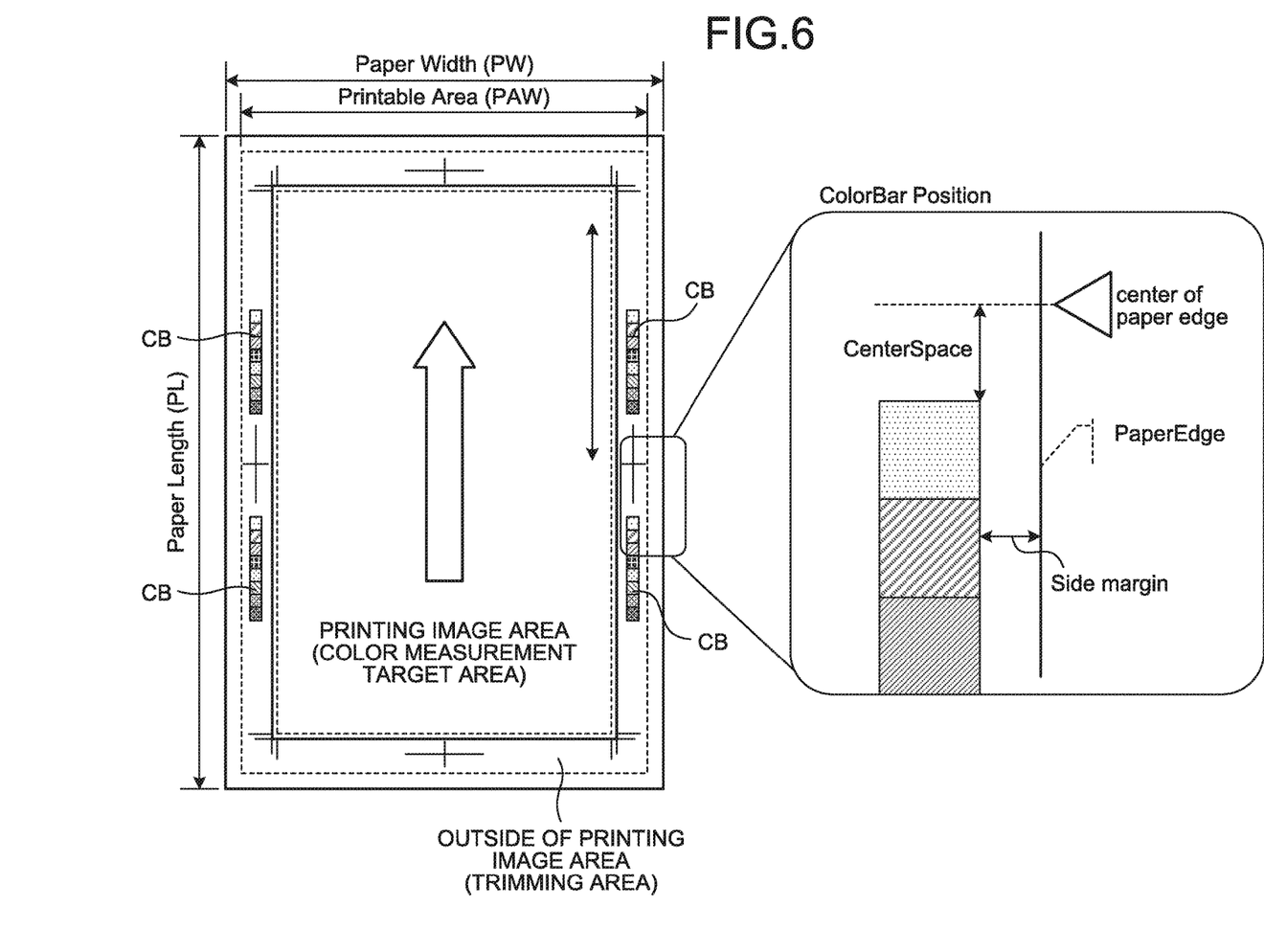
FIG. 6 is a diagram illustrating a calculation example of a color measurement area of a color patch.

FIG. 6 is a diagram illustrating a calculation example of the color patch color measurement area. It is not always possible to adequately extract a color measurement suitable area depending on a picture of a document to be printed. In general, in commercial printing, it is often the case that all sides of a paper are trimmed depending on a finish size. Therefore, when the color bar print mode is designated, the image processing unit 3 prints a color patch that is referred to as the color bar CB on trimming areas (left and right edges of the recording medium in the main-scanning direction) as illustrated in FIG. 6 as a backup for the case where it is difficult to obtain adequate color measurement data from the user image.

The color bars CB are arranged in strip forms (elongated pieces) such that the color bars are arranged at two positions, one of which is on the upper side and the other is on the lower side, in line on each of the left side and the right side, i.e., the total of four positions, of the recording medium so as to reduce influence of color deviation in a plane. In addition, the same color bars CB are arranged at the four positions for averaging. In particular, in the electrophotographic print engine, cyclic variation is likely to occur in accordance with the drum length. In this case, the color bars CB of the same color are arranged for each half cycle of the drum length.

When the color bars CB are added, colors of the color bars CB are measured by forcibly specifying a color measurement point. Assuming that a color measurement starting point for each of the patches in the left strip is (leftJ, I), and a color measurement starting point for each of the patches in the right strip is (rightJ, I), leftJ is represented as follows when Paper Width (the width of a recording medium) <MaxPAW (the maximum width that is printable by the printer engine).

leftJ=Side margin+(int)((PatchSize−MeasureArea+1)/2)

Here, Side margin is a distance from the edge of the recording medium to the color bar CB. Further, PatchSize is a size of each of the patches included in the strip, and MeasureArea is a size of the color measurement area.

Furthermore, leftJ is represented as follows when Paper Width>=MaxPAW.

leftJ=(int)((Paper Width−MaxPAW+1)/2)+Side margin+(int)((PatchSize−MeasureArea+1)/2)

In contrast, rightJ is represented as follows.

rightJ=Paper Width−leftJ−MeasureArea

Meanwhile, $I = I_0 + PatchSize \times PatchNo$ where PatchNo is a patch number in the strip. However, $I_0$ is represented by $I_0$=Paper Length/2−(PatchSize×PatchNumber+CenterSpace) for the upper strip, and $I_0$=Paper Length/2+CenterSpace for the lower strip. Paper Length is the length of the recording medium. PatchNumber is the number of patches included in the strip. CenterSpace is a distance between a midpoint of Paper Length and the color bar CB.

However, if a corresponding CMYK digital master value exceeds a range of abnormal values (highlight-limit and shadow-limit) that are defined by a resource definition file, the subject is not added to the list.

Referring back to FIG. 2, the address correcting unit 19 associates the color measurement appropriate area position, which is registered in the address list of the color measurement area extracting unit 18, with an output image position of the subtractor 15 using the address correction information obtained from the resist correcting unit 11.

The sample extracting unit 20, upon receiving input of the differential image data from the difference detecting unit 40, calculates (C; M; Y; K; $\Delta R$; $\Delta g$; $\Delta b$) as a color measurement target area average from the output image obtained from the subtractor 15 and the CMYK master image 10 through random sampling based on the corrected address list, and accumulates a result in the sample buffer 37 that is a FIFO buffer serving as a measurement sample accumulating means.

The mode parameter calculating unit 22 is a correction parameter generating unit that generates a gradation correction parameter for correcting gradation depending on a color tone variation amount that is based on the color patch color measurement area and the color measurement target area in the printing image area. The mode parameter calculating unit 22 determines a mode parameter update amount $\Delta\theta$ on the basis of samples accumulated in the sample buffer 37. A mode parameter that is a gradation correction parameter is a composite coefficient of a mode curve for best approximation of a necessary TRC correction amount. In the case of a three mode for using three mode curves for each of CMYK, the mode parameter includes a total of 12 parameters. The mode parameter is accumulated in the mode parameter buffer 38 that is a FIFO buffer serving as a gradation correction parameter accumulating means.

An initial mode parameter ($\theta_0$) and the mode parameter update amount $\Delta\theta$ are calculated using the same algorithm. For simplicity of description, hereinafter, the mode parameter update amount may be simply referred to as the mode parameter depending on situations.

The smoothing processing unit 23 determines the mode parameter update amount $\Delta\theta$ by excluding an abnormal value from the mode parameter buffer 38 and averaging a predetermined number of samples.

Meanwhile, a selection signal 34 for designating a change of a mode parameter calculation condition is set to two states of 0 and 1. A calculation condition corresponding to a selection signal value of 0 is associated with operation of setting a mode parameter reference $\theta_0$ that corresponds to an initial printing state. Further, a calculation condition corresponding to a selection signal value of 1 is associated with operation of calculating a mode parameter correction amount $\Delta\theta$ for correcting a change of a printing state. Typically, the operation of setting the reference $\theta_0$ is performed at the start of a continuous printing job. However, when a printing state in which adequate image samples are not acquired is continued, by setting the reference $\theta_0$ again at the time adequate image samples become obtainable, it is possible to prevent a drastic change in densities due to resume of the control. Therefore, in the present embodiment, when a predetermined number of printing images are not acquired or adequate image samples are not acquired in a certain time interval, the value of the selection signal 34 is reset to 0.

When the selection signal 34 is 0, the calculation condition selector 35 that is a switching means selects a parameter (a penalty value to be described later) that corresponds to a first calculation condition for giving priority to estimation accuracy. Subsequently, a value $\theta_0$ of the mode parameter memory 39 that is a gradation correction parameter holding means is updated such that $\theta_0=\Delta\theta$ using an output from the smoothing processing unit 23 (however, the initial value is 0).

When the selection signal 34 is 1, the calculation condition selector 35 selects a parameter that corresponds to a second calculation condition for giving priority to stability of a control result. However, in this case, the value of the mode parameter memory 39 is not updated.

The subtractor 24 subtracts the mode parameter $\theta_0$ that is held by the mode parameter memory 39 from the output mode parameter $\Delta\theta$ of the smoothing processing unit 23 (therefore, in particular, when the selection signal is 0, the subtracted value $\Delta\theta-\theta_0$ is always 0).

The TRC synthesizing unit 25 includes an accumulator 26, a reference TRC 42 for each of CMYK, and a mode curve 43 that is a base of approximation of a TRC change difference. The reference TRC 42 is an LUT similar to the gradation correction table 16. The accumulator 26 accumulates ($\Delta\theta-\theta_0$) obtained from the subtractor 24 after changing a symbol of the value. When a job is started and when the selection signal 34 is 0, the gradation correction table 16 is copied to the reference TRC 42, and all of elements are initialized to 0.

The TRC synthesizing unit 25 generates a synthesized TRC 44 by adding a product sum of the mode curve 43 using a corresponding element of the accumulator 26 as a coefficient to the reference TRC 42 at the timing of updating the value of the accumulator 26 for each of CMYK, and updates the gradation correction table 16 with the synthesized TRC 44.

Figure 7:
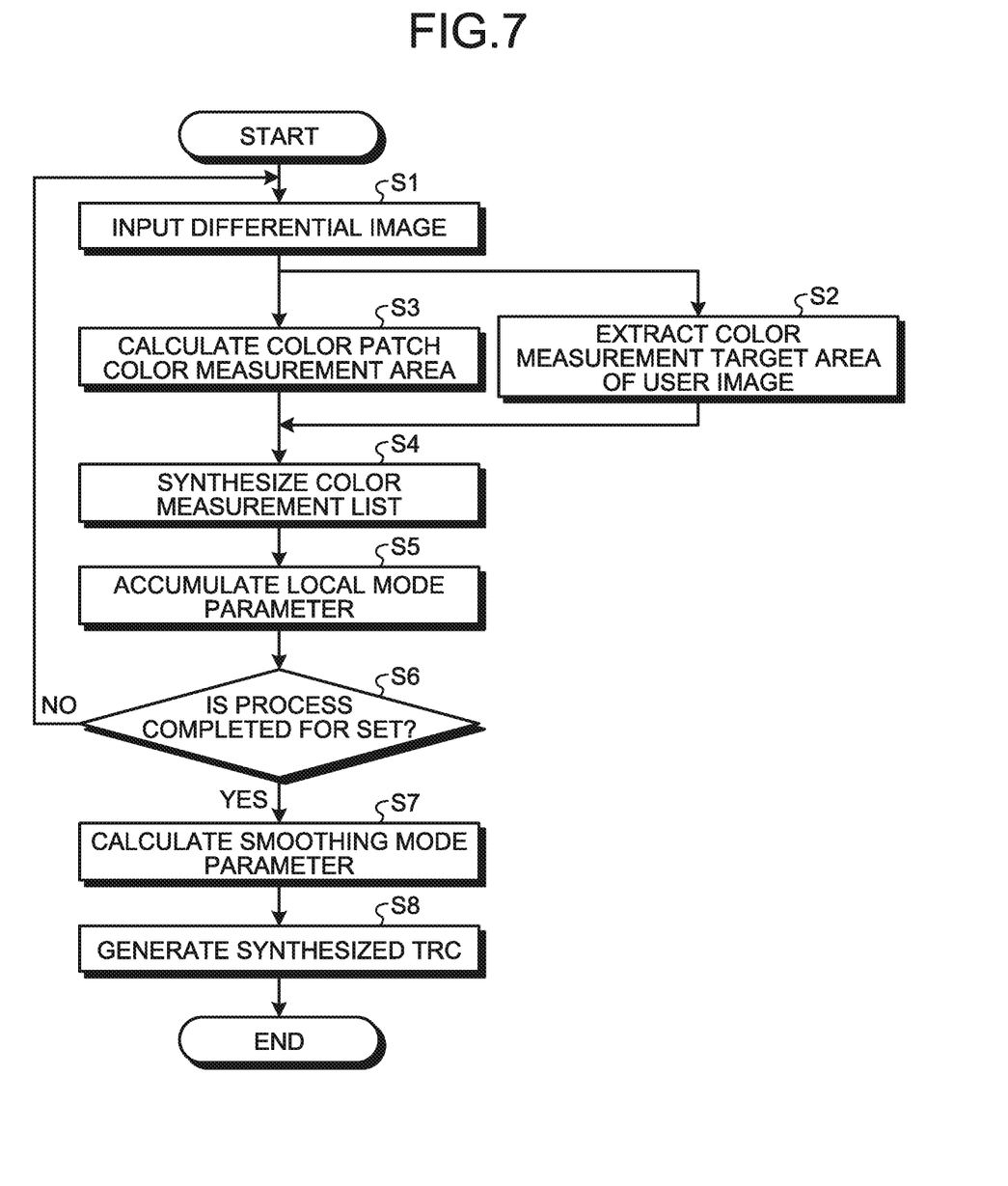
FIG. 7 is a flowchart schematically illustrating the flow of a process performed by a corrected TRC calculating unit.

FIG. 7 is a flowchart schematically illustrating the flow of a process performed by the corrected TRC calculating unit 41. As illustrated in FIG. 7, the corrected TRC calculating unit 41 receives input of the differential image data from the difference detecting unit 40 (Step S1), the vMap generating unit 51 of the color measurement area extracting unit 18 extracts the color measurement target area of the user image (Step S2), and the color patch coordinate calculating unit 53 of the color measurement area extracting unit 18 calculates the color patch color measurement area (Step S3).

Subsequently, the color measurement list synthesizing unit 55 of the color measurement area extracting unit 18 updates the color measurement list 56 by adding the color patch color measurement area 54 to the color measurement list 52 that is calculated from the vMap (Step S4).

Thereafter, the mode parameter calculating unit 22 calculates a local mode parameter based on the color measurement list 56, and accumulates the local mode parameter in the mode parameter buffer 38 (Step S5).

The processes from Step S1 to Step S5 are repeated for a predetermined number of samples that are set in advance, after the continuous print job is started (Step S6).

If the process on the predetermined number of set samples is completed (Yes at Step S6), the smoothing processing unit 23 excludes an abnormal value and obtains an average of a predetermined number of samples to thereby determine the mode parameter (Step S7).

Then, the TRC synthesizing unit 25 generates the synthesized TRC 44 by adding the mode parameter to the reference TRC 42 (Step S8).

In this manner, according to the present embodiment, by using both of data obtained by sampling the color measurement target area in the printing image area and data of the color patches provided outside the printing image area, the color measurement target areas are extracted so as to be evenly distributed as much as possible from a page and then corrected, so that it is possible to accurately correct variation in color tones and improve stability of an output image.

In the embodiment as described above, the example has been described in which the color tone control device and the image forming apparatus of the present invention are applied to an image forming apparatus that includes an electrophotographic printer engine; however, the present invention is not limited to this example, and it is possible to apply the present invention to an image forming apparatus that includes an inkjet printer engine.

Furthermore, in the embodiment as described above, the example has been described in which a simple image forming apparatus (printer) is described as the color tone control device and the image forming apparatus of the present invention; however, the present invention is not limited to this example, and may be applied to any of a multifunction peripheral that has at least two of a copy function, a printer function, a scanner function, and a facsimile function and an image forming apparatus, such as a copier, a printer, a scanner device, or a facsimile machine.

According to the present invention, it is possible to dynamically correct color tones with accuracy without the influence of a picture of a printing image and improve stability of an output image.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A color tone control device comprising:
 circuitry configured to
 extract from master image data, where in the master image data comprises both a printing image area and color patch added outside the printing image area, an image color measurement from an image color measurement target area in the printing image area;
 extract a color patch measurement from a color patch measurement area from the master image data; and
 generate a gradation correction parameter for correcting gradation depending on a color tone variation amount that is based on the color patch measurement area of the color patch and the image color measurement target area in the printing image area.

2. The color tone control device according to claim 1, wherein
 the circuitry is further configured to
 generate a color measurement list of a color measurement area by synthesizing the color patch measurement area of the color patch and the image color measurement target area in the printing image area, and
 generate the gradation correction parameter using the color measurement list.

3. The color tone control device according to claim 1, wherein
 the circuitry is further configured to generate the master image data that serves as a reference standard.

4. The color tone control device according to claim 1, wherein
 the circuitry calculate the color patch measurement area of the color patch provided outside the printing image area, depending on a size of a recording medium on which the master image is recorded.

5. An image forming apparatus comprising:
 an image forming unit that forms an image on a recording medium; and
 the color tone control device according to claim 1, the color tone control device controlling a color tone in the image forming unit based on master image data that is generated on the recording medium by the image forming unit.

6. The color tone control device according to claim 1, wherein
 the gradation correction parameter is a function of a difference between the image color measurement and a predicted image.

7. The color tone control device according to claim 2, wherein
 a gradient curve is compiled as a function of the gradation correction parameter, and the gradient curve is stored in a lookup table.

8. The color tone control device according to claim 1, wherein
the circuitry further comprises a difference detecting unit.

9. The color tone control device according to claim 8, wherein the difference detecting unit further comprises a color measurement predicting unit, a resist correcting unit, and a subtractor.

10. The color tone control device according to claim 9, wherein the color measurement predicting unit predicts an RGB measurement value to be scanned by a scanner from a CMYK value of a CMYK master image.

11. The color tone control device according to claim 9, wherein the resist correcting unit corrects minute deviations detected by the difference detecting unit between the master image data and a predicted image.

12. The color tone control device according to claim 9, wherein the subtractor outputs differential image data obtained by subtracting a predicted image from the master image data.

13. The color tone control device according to claim 1, wherein the gradation correction parameter is calculated as a function of an average of the image color value and the color patch value.

14. A color tone control device comprising:
circuitry configured to
produce master image data having both a printing image area and a color patch area added outside the printing image area;
calculate an image color measurement area in the printing image area and calculate a color patch measurement area in the color patch area;
extract an image color measurement area from the printing image area and extract a color patch measurement area from the color patch area;
obtain an image color value as a function of a difference between the image color measurement area taken from a printing image area printed on a recording medium, and an expected image color measurement area derived from a stored CMYK master image;
obtain a color patch value as a function of the difference between the color patch measurement area taken from a color patch area printed on a recording medium and an expected color patch measurement derived from the stored CMYK master image;
calculate a gradation correction parameter as a function of the image color value and the color patch value;
produce a gradation correction table which tracks the gradation correction parameter across multiple dimensions;
apply the gradation correction table to predict future measurements; and
apply the gradation correction table to calibrate the printing image area.

15. A color tone control device according to claim 14, wherein the gradation correction parameter is calculated as a function of an average of the image color value and the color patch value.

16. A method to control color tone comprising:
producing master image data having both a printing image area and a color patch area added outside the printing image area;
calculating an image color measurement area in the printing image area and calculating a color patch measurement area in the color patch area;
extracting an image color measurement area from the printing image area and extract a color patch measurement area from the color patch area;
obtaining an image color value as a function of a difference between a image color measurement area taken from a printing image area printed on a recording medium, and an expected image color measurement area derived from a stored CMYK master image;
obtaining a color patch value as a function of the difference between a color patch measurement area of a color patch area printed on a recording medium and an expected color patch measurement derived from the stored CMYK master image;
calculating a gradation correction parameter as a function of the image color value and the color patch value;
producing a gradation correction table which tracks the gradation correction parameter across multiple dimensions;
applying the gradation correction table to predict future measurements; and
applying the gradation correction table to calibrate the master image.

17. The method to control color tone according to claim 16, wherein the gradation correction parameter is calculated as a function of an average of the color patch value and the image color value.

* * * * *